H. J. SHEEDY.
RESILIENT VEHICLE WHEEL.
APPLICATION FILED AUG. 19, 1911.
1,029,323.
Patented June 11, 1912.
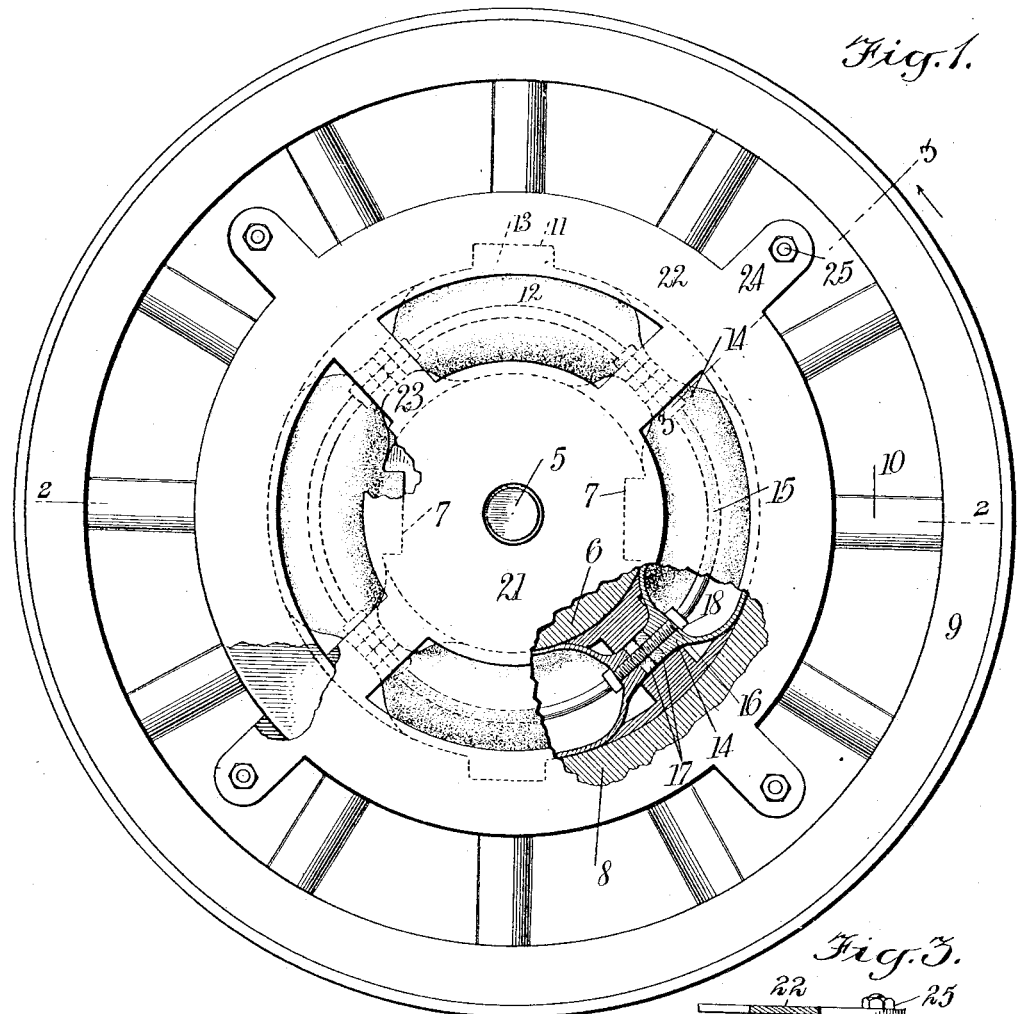
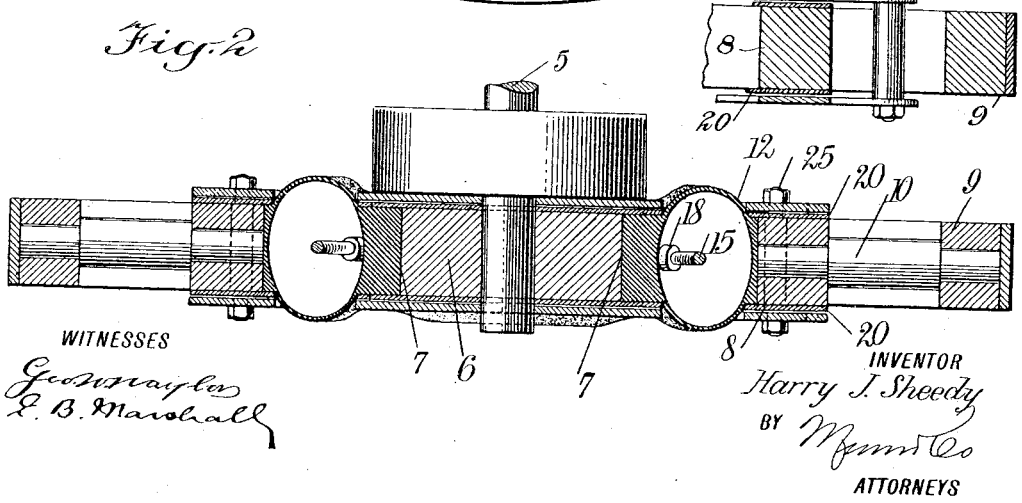
WITNESSES
INVENTOR
Harry J. Sheedy
BY
ATTORNEYS

UNITED STATES PATENT OFFICE.

HARRY J. SHEEDY, OF SCRANTON, PENNSYLVANIA, ASSIGNOR OF ONE-HALF TO JACOB R. SCHLAGER, OF SCRANTON, PENNSYLVANIA.

RESILIENT VEHICLE-WHEEL.

1,029,323.  Specification of Letters Patent.  Patented June 11, 1912.

Application filed August 19, 1911. Serial No. 644,979.

*To all whom it may concern:*

Be it known that I, HARRY J. SHEEDY, a citizen of the United States, and a resident of Scranton, in the county of Lackawanna and State of Pennsylvania, have invented a new and Improved Resilient Vehicle-Wheel, of which the following is a full, clear, and exact description.

My invention relates to resilient vehicle wheels and it has for its object to provide one having a hub and a rim member spaced therefrom and disposed therearound, there being recesses in the hub and in the rim member for receiving projections on pneumatic members, which are disposed between the hub and the rim members, the pneumatic members being reinforced by rods having threaded terminals which project through the terminals of the pneumatic members, and which are engaged by nuts for pressing the terminals of the pneumatic members against shoulders on the rods, the nuts engaging neighboring nuts.

Additional objects of the invention will appear in the following complete specification, in which the preferred form of the invention is disclosed.

In the drawings similar characters of reference indicate corresponding parts in all the views, in which—

Figure 1 is a side elevation of one of my improved wheels partially in section; Fig. 2 is a sectional view on the line 2—2 of Fig. 1; and Fig. 3 is a sectional view on the line 3—3 of Fig. 1.

By referring to the drawings it will be seen that on the axle 5 there is mounted the hub 6, the said hub having two recesses 7 in its periphery. Disposed around and spaced from the hub 7 there is an inner rim 8, which is connected with a felly 9 by the spokes 10. In the inner surfaces of the inner rim 8 there are recesses 11, which correspond with the recesses 7 in the hub 6, the recesses 11 being disposed in advance of the recesses 7. Disposed between the hubs 7 and the inner rim 8 there is a plurality of pneumatic members 12, each of these pneumatic members 12 having a projection 13, which seats in one of the recesses 7 or 11. The pneumatic members 12 converge at their ends 14, and in the pneumatic members there are disposed curved rods 15, the threaded terminals 16 of which extend through the ends 14 of the pneumatic members. The said threaded terminals are engaged by nuts 17, which press the ends 14 of the pneumatic members against shoulders 18, secured to the rods 15, and disposed in the pneumatic members. The nuts 17 are polished so that they will present smooth surfaces which engage each other. Plates 20 are provided, which are secured to the sides of the inner rim 8, and which engage the sides of the pneumatic members 12, at their outer edges. I also provide side plates 21, which are mounted on the axle 5, and which are secured to the hub 6, these side plates 21 having circular outer members 22, which are connected to the body of the side plates by the radial arms 23, which are connected with the body member 21. Integral with the circular outer plates there are lugs 24, these lugs 24 on the two side plates being connected together by the bolts 25.

It will be understood that by removing the side plates 21, and the plates 20 the pneumatic members 12 may be readily removed, but as they will be protected from obstructions on the road there is no danger of puncture, and, in consequence they may be used for a long period without removing. The pneumatic members 12 may be inflated by any preferred means.

Having thus described my invention I claim as new and desire to secure by Letters Patent:

1. In a resilient wheel a hub having a recess, a rim having a recess spaced from the hub and disposed therearound, a plurality of elongated detached resilient members disposed end to end between the hub and the rim, and projections on the resilient members between their ends and disposed in the recesses.

2. In a resilient wheel a hub, a rim spaced from the hub and disposed therearound, a pneumatic member disposed between the hub and the rim, a rod disposed longitudinally through the pneumatic member, and having shoulders and threaded terminals spaced therefrom, and nuts engaging the threaded terminals for pressing the ends of the pneumatic member against the shoulders.

3. In a resilient wheel a hub, a rim spaced from the hub and disposed therearound, a plurality of detached pneumatic members disposed end to end and between the hub and the rim, a rod disposed through each of the pneumatic members and having shoulders and threaded terminals spaced therefrom, and nuts engaging the threaded terminals for pressing the ends of the pneumatic members against the shoulders.

4. In a resilient wheel a hub having a recess, a rim having a recess spaced from the hub and disposed therearound, a plurality of pneumatic members having projections, the pneumatic members being disposed end to end and between the hub and the rim with their projections disposed in the recesses, a rod disposed through each of the pneumatic members, having shoulders and threaded terminals spaced therefrom, and nuts engaging the ends of the threaded terminals for pressing the ends of the pneumatic members against the shoulders.

5. In a resilient wheel a hub, a rim spaced from the hub and disposed therearound, a plurality of pneumatic members disposed end to end and between the hub and the rim, a rod disposed through each of the pneumatic members and having shoulders and threaded terminals spaced therefrom, nuts engaging the threaded terminals for pressing the ends of the pneumatic members against the shoulders, and side plates engaging the sides of the hub and the rim.

6. In a resilient wheel a hub having a recess, a rim having a recess spaced from the hub and disposed therearound, a plurality of pneumatic members having projections, the pneumatic members being disposed end to end and between the hub and the rim with their projections disposed in the recesses, a rod disposed through each of the pneumatic members, having shoulders and threaded terminals spaced therefrom, nuts engaging the ends of the threaded terminals for pressing the ends of the pneumatic members against the shoulders, plates secured to the rim for engaging the sides of the pneumatic members, and side plates engaging the hubs and the first-mentioned plates.

7. In a resilient wheel a hub, a rim spaced from the hub and disposed therearound, a plurality of resilient members disposed end to end and between the hub and the rim, and side plates engaging the hub and extending radially at each side of the wheel and having arms engaging the ends of the resilient members with openings between the arms to permit the lateral expansion of the resilient members.

In testimony whereof I have signed my name to this specification in the presence of two subscribing witnesses.

HARRY J. SHEEDY.

Witnesses:
L. C. JAYNE,
A. P. HOFFMAN.